J. BECKER.
FOCUSING CAMERA.
APPLICATION FILED MAY 9, 1912. RENEWED SEPT. 7, 1915.
1,195,948.
Patented Aug. 22, 1916.
2 SHEETS—SHEET 1.
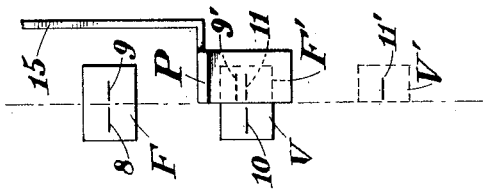
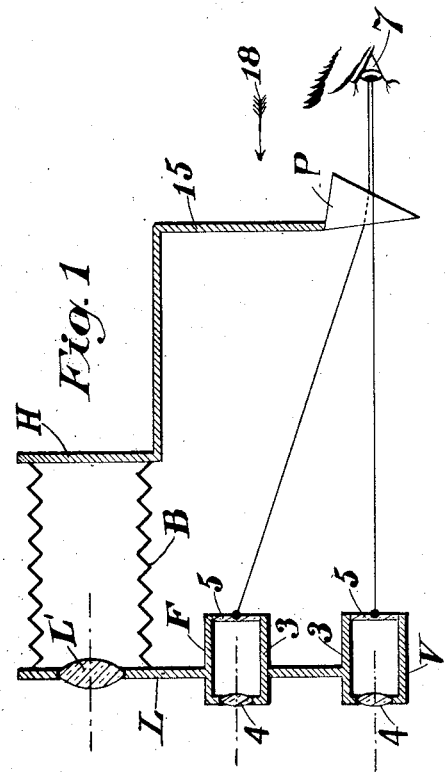
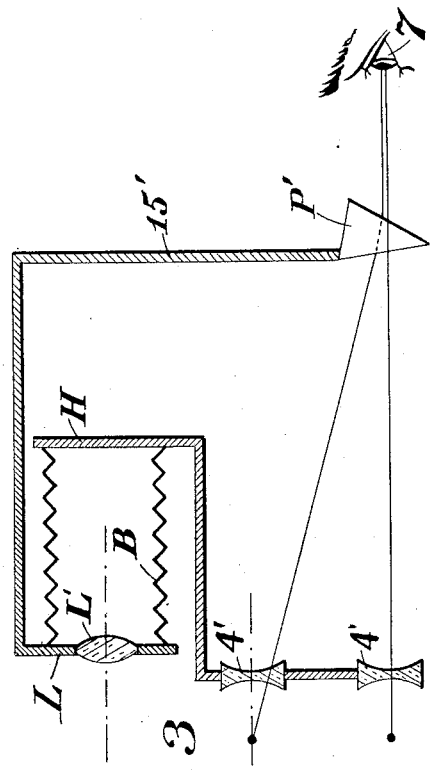
Witnesses:
William Pyne
Aloysius M. Finn
Inventor
Joseph Becker

UNITED STATES PATENT OFFICE.

JOSEPH BECKER, OF WASHINGTON, DISTRICT OF COLUMBIA.

FOCUSING-CAMERA.

1,195,948.  Specification of Letters Patent.  Patented Aug. 22, 1916.

Original application filed June 15, 1901, Serial No. 64,722. Divided and this application filed May 9, 1912, Serial No. 696,197. Renewed September 7, 1915. Serial No. 49,385.

*To all whom it may concern:*

Be it known that I, JOSEPH BECKER, a citizen of the United States, residing at Washington, in the District of Columbia, have invented a new and useful Improvement in Focusing-Cameras, of which the following is a specification.

The present application identified for convenience of reference as Case W is a division of my prior application, Case D, for improvements in focusing cameras, filed June 15, 1901, Serial No. 64,722, and it relates to those specific forms thereof in which the necessary relative motions of the principal focuser parts shall be the same in extent and direction as the corresponding relative motions of the lens and image receiving-surface of the camera; so that the one focuser part may be mounted in fixed relation to the camera lens, while the other is mounted in fixed relation to the image receiving-surface of the camera, thus permitting the use of the simplest possible mechanical connection between focuser and camera parts, and dispensing with the levers, cams or other mechanism which must otherwise be used for converting large displacements into small ones, as seen, for instance, in my prior application, Case B, Serial No. 42,957, filed January 12, 1911.

Five different embodiments of the invention will be illustrated, but in all the camera consists of the usual lens-holding-frame, bellows, and plate-or-film-holding-frame, and it comprises, combined with these usual parts or their equivalents, an external arrangement which I have already referred to as the "focuser" and which is adapted to produce the impression of two retinal images of the object to be photographed or of complementary parts thereof, even while the plate or film is being exposed, such images being obtained by virtually viewing the object from two different points on the camera; the whole being so combined, arranged or adjusted that the two images shall have an apparent relative position, depending simultaneously upon the distance of the object and upon the depth of the camera, and shall, furthermore, be, or at least appear to be, in perfect register or coincidence whenever the camera is sharply in focus on the object viewed.

Figure 4:
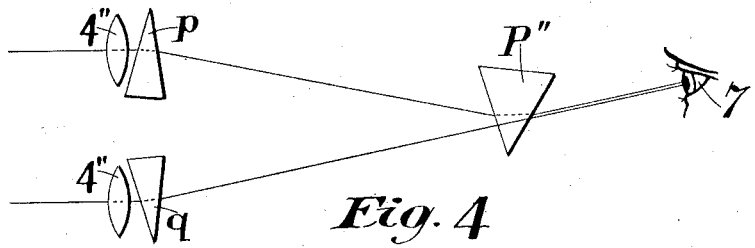
Figure 5:
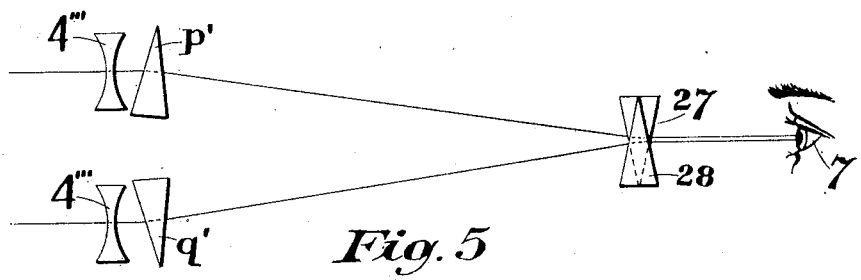
Figure 6:
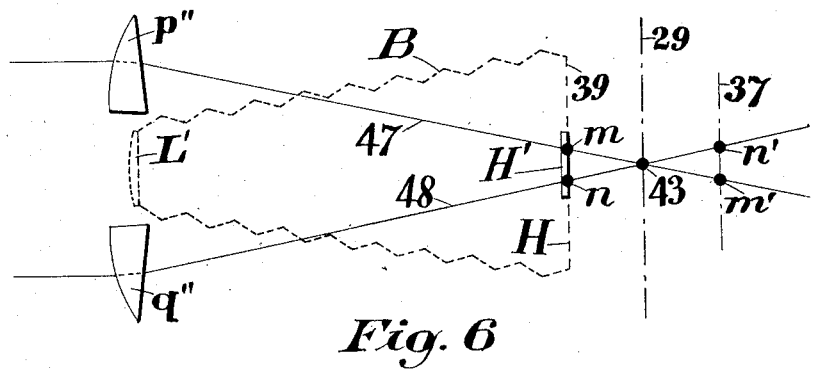

In the accompanying drawings: Figure 1 is a sectional view of an arrangement in which the relatively movable images are produced by means of two diminutive cameras and a prism; Fig. 2 is a view looking in the direction of arrow 18, Fig. 1, the camera proper being omitted; Fig. 3 is a sectional view of a second form in which the relatively movable images are produced by means of divergent lenses and a prism; Figs. 4 and 5 are variations of Fig. 3, constituting the third and fourth forms, respectively; Fig. 6 is a side elevation of a fifth form in which the relatively movable images are formed by two eccentric lens elements and a screen.

In Fig. 1, L, B and H represent, respectively, the lens holding frame, bellows and plate holding frame of a camera, which is provided with means (not shown) for adjusting the depth or distance between L and H. L′ refers to the lens carried in such lens holding frame L. On the lens holding frame are fixed two similar diminutive cameras or finders F and V, each comprising a case 3, lens 4, and screen 5. To facilitate the description, these finders are supposed to be one over the other in the same vertical plane. On the plate holding frame H is fixed a prism P, which, as seen in Fig. 2 is set to apparently overlap one-half of the lower finder V. For the observer, whose eye is at 7, the part of finder V which lies behind the prism is, by refraction, apparently dropped to V′ and in its original place is seen the half F′ of the upper finder F. If a horizontal bar be viewed in the finders it will form in the upper finder an image 8, 9, the right half 9 of which will be dropped by refraction to 9′ and the same bar will form in the lower finder an image 10, 11, part 10 of which appears directly as seen in Fig. 2, and part 11 (dotted) as dropped to 11′. As 11 is not visible except at 11′, the finder image of the bar as seen in V, therefore, comprises parts 10 and 9′. Now, by varying the depth of the camera the half image 9' can be moved up and down and be made to register with half image 10 and form therewith a continuous image. On the other hand, if the original bar moves either closer to or farther away from the camera, the half images 10 and 9' will be either separated or approached because their originals 10 and 9 on screens 5 are separated when the object approaches, and vice versa. The continuity of the image, therefore, depends simultaneously upon the distance of the object and the depth of the camera; and I have discovered that the parts can always be proportioned and adjusted by calculation or by direct observation, so the camera shall be sharply in focus on any object whenever its finder image 10, 9' appears continuous.

If the lenses 4 are large in diameter as compared with their focal length, the screens 5 may be omitted. No screens can be used with minus lenses, but in this case the motions are reversed. I have secured this reversal by simply cross connecting the parts as shown in Fig. 3 so the prism P' shall move with the camera lens L and the finder lenses 4', 4' with the camera plate or film holder H. When lenses without screens are used, such as lenses 4'', 4'', Fig. 4, or 4''', 4''', Fig. 5, it is better to add prisms $p$, $q$, Fig. 4, or $p'$, $q'$, Fig. 5, which permit of securing a better field.

In Fig. 5 by the use of reversed prisms 27, 28, the arrangement is made symmetrical and optically better, because in it the refractions are less than in the preceding forms, and colorations are avoided by the reversal of prisms. In all the prism forms so far described the indications depend solely on the distance from L to H and are not appreciably affected by lateral displacements or vibrations. This is a great advantage.

In Fig. 6 I show a form in which the coincidence of the images is real, as well as apparent. The camera shown dotted carries externally on its plate or film holding frame H a screen H' and on its lens holding frame a pair of prisms $p''$, $q''$ having one face spherical. These prisms act like small eccentric lens elements, that is, like lenses of considerable depth of focus so as to produce on the screen H' images $m$ $n$ which remain clear through considerable movements of the screen. Thus by moving the screen H' from 39 back to 37 the image $m$ formed by the upper lenticular prism may be considered as moving with the screen, but along line 47 from $m$ to $m'$, that is, to have a downward motion on the screen. Similarly, the image $n$ formed by the lower lenticular prism also moves, but along line 48 from $n$ to $n'$, or upwardly on the screen H. When both images are observed together and screen H' is moved from 37 to 39, the two images first seen as $n'$, $m'$ will approach to meet at 43 in plane 29 and then cross and separate so as to be finally seen as $m$, $n$ in plane 39. By giving the prisms an angle and a separation that will make their refracted rays cross like those of the camera lens and by giving them about the same curvature as the lens, the prismatic arrangement will by coincidence or separation of images indicate whether the camera is or is not in focus on a given object. One disadvantage of this form as compared with the others is that it does not indicate directly in which direction the camera may be out of focus, unless the images are identified by momentarily covering one of the two prismatic lenses.

All the devices so far described are combined to produce eventually two retinal images which may be relatively moved within the observer's eye and there brought into actual coincidence; whether the outside images do or do not actually coincide is immaterial.

What I claim as my invention and desire to secure by Letters Patent is:

1. In a device for focusing the lens of a photographic camera, image producing optical elements located at the ends of a baseline and image displacing optical elements coöperating with said image producing elements, said image producing and image displacing optical elements adjustable toward each other in rectilinear direction parallel to the axis of the camera lens and adapted to produce coincident images of each distant object on proper adjusting of their distance, and means for adjusting the objective of the photographic camera with relation to the image plane of same in accordance with the adjustment of the image producing and image displacing elements of the focusing device.

2. In a device for focusing the lens of a photographic camera, image producing optical elements located at the ends of a baseline connected to the photographic camera, image displacing optical elements coöperating with said image producing elements and connected to a part of the camera adjustable with relation to that part which is in connection with said image producing elements, said image producing elements and said image displacing optical elements movable toward each other in rectilinear direction and adapted to produce coincident images of any object the image of which is in focus in the camera.

3. The combination with a focusing camera comprising a lens support, a plate or film support, and means for varying the distance separating such supports to permit of setting the camera in focus on an object in the camera field; of an external focusing means or "focuser" adapted to form apparently registering external real or virtual images of an object-point in the camera field when the camera is in focus on such object-point, said "focuser" comprising an optical element, or elements, mounted in fixed position with relation to the said lens support and another optical element, or elements, mounted in fixed position with relation to the said plate or film support.

In testimony whereof, I have signed my name to this specification in the presence of two subscribing witnesses.

JOSEPH BECKER.

Witnesses:
MARY E. COWELL,
H. P. HOWARD, Jr.

Copies of this patent may be obtained for five cents each, by addressing the "Commissioner of Patents, Washington, D. C."